Aug. 27, 1935.  W. H. CONKLIN  2,012,924
FLASH AND TOUCH BOX
Filed March 17, 1933  2 Sheets-Sheet 1

INVENTOR
William H. Conklin
BY
Wooster Davis
ATTORNEYS

Aug. 27, 1935.　　　　W. H. CONKLIN　　　　2,012,924
FLASH AND TOUCH BOX
Filed March 17, 1933　　　　2 Sheets-Sheet 2
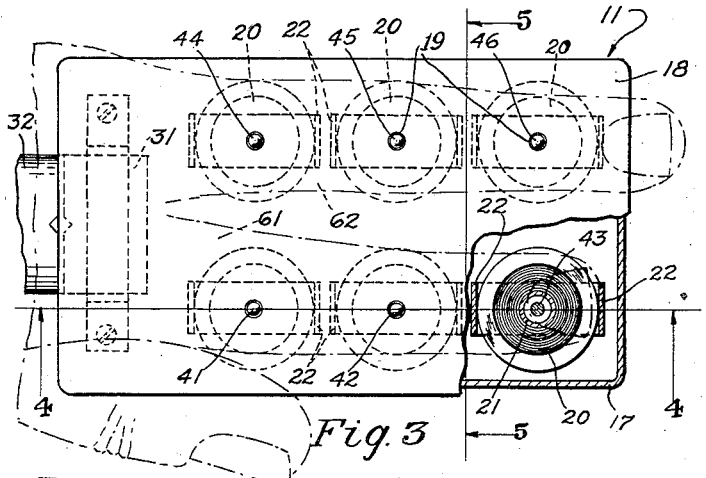
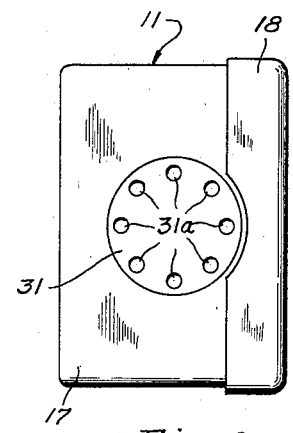
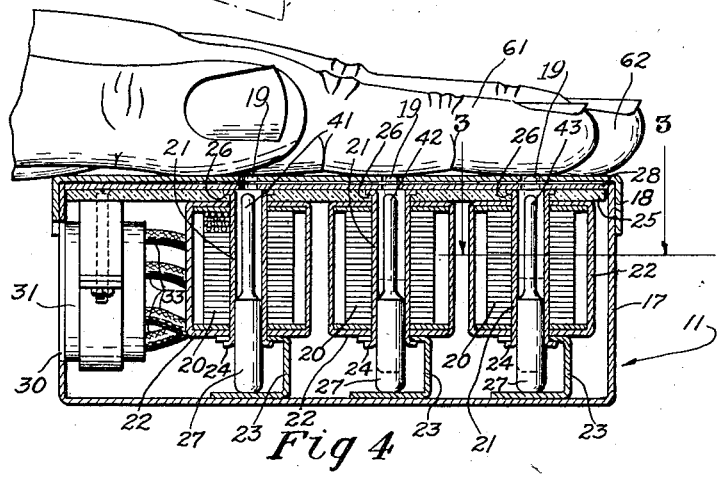
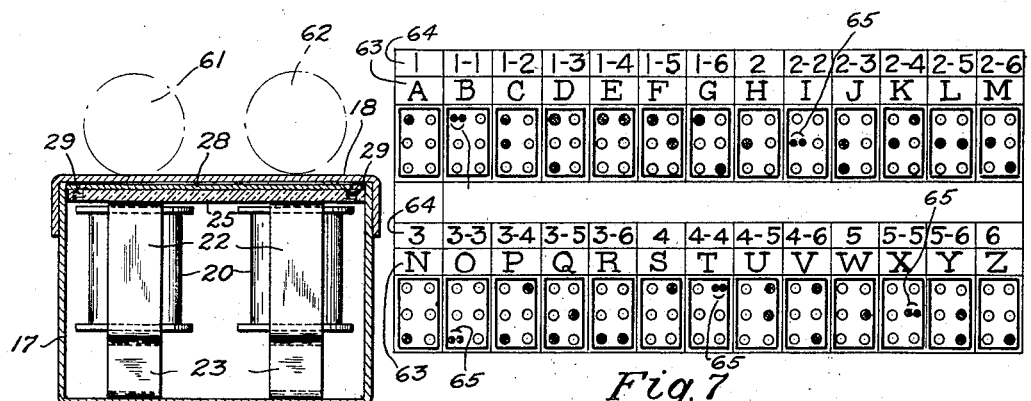
INVENTOR
William H. Conklin
BY
Wooster Davis
ATTORNEYS Patented Aug. 27, 1935

2,012,924

UNITED STATES PATENT OFFICE 2,012,924

FLASH AND TOUCH BOX

William H. Conklin, Ansonia, Conn.; Paul A. Conklin administrator of said William H. Conklin, deceased Application March 17, 1933, Serial No. 661,263

5 Claims. (Cl. 177—337)

This invention relates to new and useful improvements in means for transmitting intelligence and has relation to means such as disclosed in my prior Patent No. 1,771,953 of July 29, 1930.

An object of the invention is to provide an intelligence transmitting means which may be used in conversing with the blind and deaf to transmit a message to them.

Another object is to provide an intelligence transmitting means which may be used by the dumb for transmitting a message to the blind or to the deaf.

Another object is to provide a means as stated, intelligence being transmitted to the blind or blind and deaf through their sense of touch and which means may, if desired, include a visual indicator through which intelligence may be communicated to the deaf.

A further object is to provide a means as indicated and which is of simple construction and which is easy to operate and which transmits intelligence by signals indicating letters of the alphabet and which may be used for transmitting code or otherwise.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 3 is a view partly in elevation and partly in section, the device being sectioned as indicated by the line 3—3 of Fig. 4, and the view showing the portion of the device operating to transmit intelligence through the sense of touch of the one to whom the intelligence is being transmitted;

Fig. 4 is a longitudinal sectional view taken substantially along the line 4—4 of Fig. 3;

Fig. 5 is a transverse sectional view taken substantially along the line 5—5 of Fig. 3;

Fig. 6 is an end elevational view looking from the left in Fig. 3; and

Fig. 7 shows an alphabet which may be used.

Figures 1, 2:
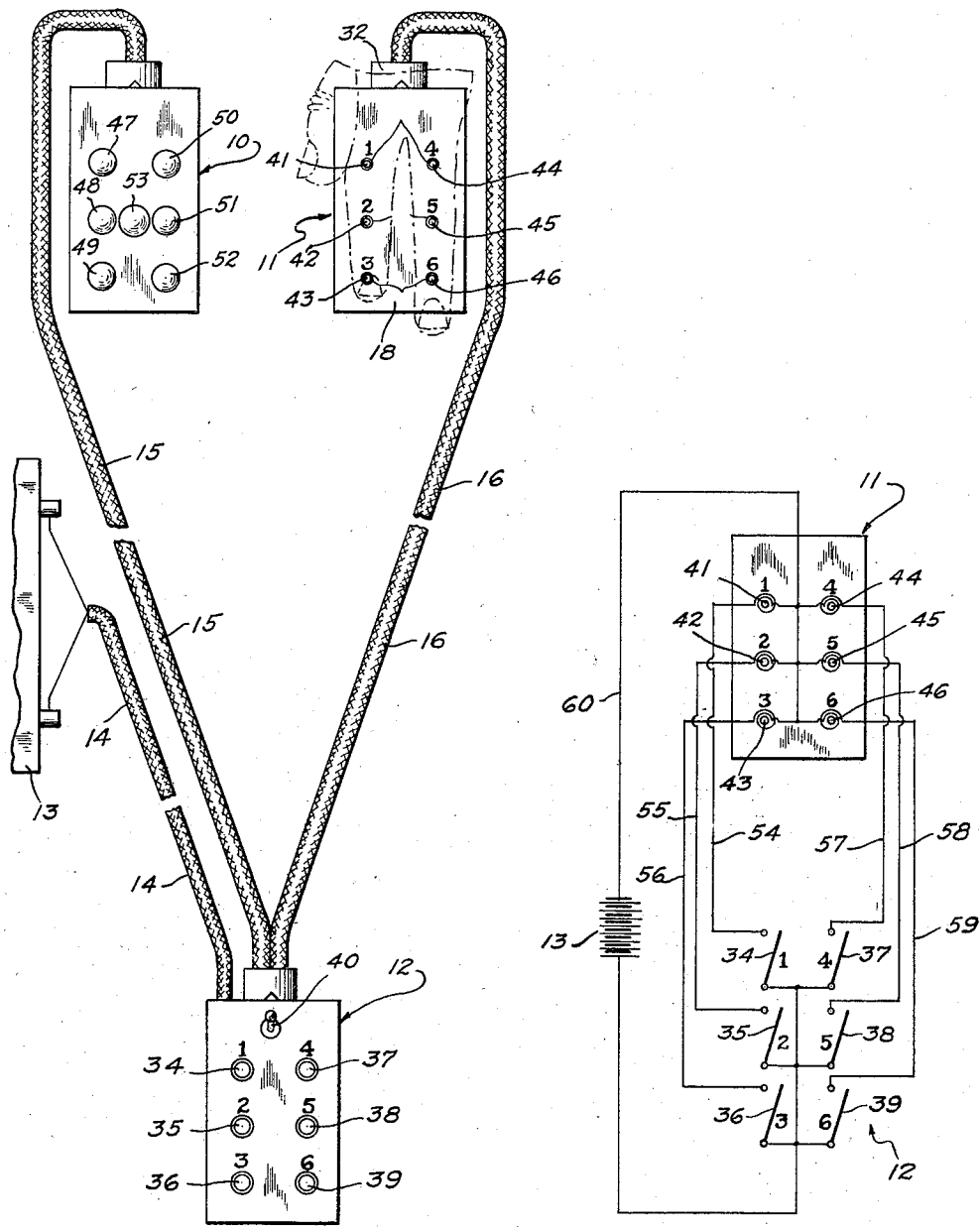
Fig. 1 is a front elevational view of a device embodying the invention.
Fig. 2 shows the wiring diagram.

Referring in detail to the drawings, at 10 is shown a device through which intelligence may be transmitted to those having the sense of sight and at 11 is shown a means through which intelligence may be transmitted by the sense of touch of the person receiving the intelligence. Both of the means 10 and 11 may be connected to be controlled or actuated by suitable switch mechanism mounted by a support or box 12 which is preferably portable and may be held in the hand as are the devices 10 and 11. Current may be supplied from any suitable source as from a battery 13 and the latter may be connected to the control means 12 through a cable 14 while the control means is connected to the devices 10 and 11 by cables 15 and 16 respectively.

The device 10, and insofar as such device is concerned the control means 12 is the same as that disclosed in my patent above referred to in both construction and mode of operation. The means 11 comprises a housing including a box or body portion 17 having a cover 18 applied thereto and this cover may, if desired, be secured in any suitable manner as by having a relatively tight fit on the box. Cover 18 has a series of openings 19 therein the openings being spaced apart. In the present instance they are arranged in two parallel rows there being three openings in each row and the openings in one row being arranged in lateral alignment with those in the other row. Other arrangements, however, may be used if found more desirable, but this arrangement is preferred.

Within the box 17 are a series of magnetic coils 20 each mounted on a tubular core 21 and each enclosed by a yoke 22 the yokes being supported as on aluminum supports or brackets 23 disposed on the bottom wall of the box and secured to the yokes as by the cores 21 which may have their lower ends turned or spun over as at 24 for this purpose. The upper ends of the cores 21 pass through the yokes and are also carried through an insulating sheet 25 into which their upper out-turned ends 26 may be countersunk as best shown in Fig. 4. With this arrangement it will be noted that the tubular cores 21 serve to secure together the respective coils, brackets and yokes and that said cores also serve to secure the parts to the insulating base or sheet 25.

Within each core 21 there is arranged a steel pin or plunger 27 having a lower portion of relatively large diameter but freely slidable in its respective core. These pins have their upper portions reduced to pass through openings in an aluminum plate 28 secured to the upper surface of the insulating plate 25 as by screws 29 or other suitable means. It will be understood that the openings through the cores 20 and plate 28 are in alignment with the respective openings 19 in the cover 18. By reference to Fig. 4 it will be noted that the openings in the cover and in the plate 28 are somewhat smaller in diameter than the inner diameters of the cores 21. The object of this arrangement is to prevent the pins 27 from moving out of the device, it being apparent that the pins may move outwardly through the openings until shoulders, represented by the outer ends of the inner relatively large diameter portions of the pins, abut the inner surface of the plate 28. This plate is not needed as long as the cover 18 is in place and the plate is simply provided to prevent loss of the pins when the cover is removed.

In one of its end walls the box 17 is provided with an opening 30 and within the box and in alignment with said opening is a receptacle 31 enclosing contacts, not shown, and adapted to have necessary lead wires connected to it as by a plug 32 having tubular contact fingers, not shown, to enter openings 31a in the end of the receptacle and engage the contacts therein to make the electrical connection in the usual manner, and in Fig. 4 at 33 is suggested the wires from the plug to the various coils 20. When the coils are deenergized the pins 27 occupy the lower or full line positions of Fig. 4 and on energizing of the coils the pins are drawn upwardly so as to project their reduced upper end portions through the openings 19 in the cover 18. The control means 12 comprises a suitable box or panel mounting a series of switches 34, 35, 36, 37, 38, and 39 which may be the usual push button switch. Also, mounted on this panel is a switch 40 which may be a snap switch.

To facilitate the description of the operation the upper reduced portions of the pins 27 are given separate designations and these portions are numbered 41, 42, 43, 44, 45, and 46 respectively. The visual indicator includes lights 47, 48, 49, 50, 51, and 52 arranged in two parallel rows of three lights each, the switches being arranged in similar rows as are the pins 41 through 46. Between the lights 48 and 51 is a guide or pilot light 53. In connection with the visual indicator 10 switch 34 controls light 47, switch 35 controls light 48, switch 36 controls light 49, switch 37 controls light 50, switch 38 controls light 51 and switch 39 controls light 52. The snap switch 40 may control the guide or pilot light 53 which would only be used at night so that the location of the other lights relatively will be understood. Preferably, light 53 is of a different color from the other light for easy distinction and light 53 may be green while the other lights may be red or white or any other suitable color.

Fig. 2 shows the wiring diagram for the device 11 and the control means 12. From that figure it will be apparent that the switches 34, 35, 36, 37, 38, and 39 control the coils of pins 41, 42, 43, 44, 45, and 46 respectively. The lead wires are indicated at 54, 55, 56, 57, 58, and 59 respectively and the common return wire is indicated at 60. In actual practice these wires are all incorporated in the cable 16. The wiring diagram and the operation of the visual indicator 10 is fully disclosed in my prior patent above referred to.

When a message is to be transmitted through the device 11 the fore or index finger of the left hand is placed on the cover 18 over the openings 19 registering with the upper reduced portions 41, 42 and 43 of the pins and the middle finger is located over the other row of openings and above the pins having the reduced upper portions 44, 45, and 46. On closing of the various push button switches the respective coils 20 will be energized and the respective pins drawn upwardly to project their reduced portions through the openings 19. The locations of these openings is such that the pin 43 will engage the distal joint of the finger while the pin 42 will engage the medial joint and the pin 41 will engage the proximal joint. The pins of the other row engage corresponding portions of the middle finger. Figs. 1 and 3 suggest by dotted lines the positioning of the fingers while Fig. 4 shows the fingers in full lines, the index finger being designated 61 and the middle finger being designated 62.

As the switches 34 through 39 are arranged in the same order and relative arrangement as are the pins 41 through 46 respectively it is a simple matter for the operator to work the switches to operate any individual pin or any combination of that pin with any other pin. Through the sense of touch a signal may easily be transmitted to one who is blind and the device 11 may be supported on a table or held in one hand as is desired, its position being more or less immaterial. The six pins and coils disclosed provide a sufficient number of different signals for transmitting any desired message. However, if it is found desirable to transmit a larger number of different combinations involving the use of not more than two touches by any one pin this may be accomplished by adding additional pairs of pins and coils. This would appear unnecessary and the use of the six pins and coils is preferred since when such an arrangement operates, one pin engages each joint of each of two fingers so that the pins are more readily distinguished.

In Fig. 7 I have illustrated by way of example an alphabet which may be used with this device for transmitting any message desired. This is merely suggestive since various signals may be used for different letters as desired, but the alphabet illustrated is simple and easy to learn. The line 63 indicates the letters corresponding to the signals under each letter and the small circles represent the various pins 41 through 46 and the push buttons 34 to 39, and where the circles are darkened this is to indicate that that particular pin is projected. In learning the alphabet pin 41 is considered as No. 1, pin 42 as No. 2, pin 43 as No. 3, pin 44 as No. 4, pin 45 as No. 5, and pin 46 as No. 6. These correspond with the numbers in the lines indicated at 64. It will therefore be apparent that in making up this particular alphabet the touch pins are taken in regular order making it easier to memorize the alphabet. Where the darkened circles are shown twice and connected by a curved line 65 this is to indicate that the particular pin is actuated twice in quick succession for that particular letter of the alphabet.

From the foregoing it will be understood that through the use of the devices 11 and 12 messages may be readily transmitted to the blind, the person receiving the message having his or her fingers of the left hand arranged over the openings 19 as above explained. Also, by proper manipulation of the switches 34 through 37 messages may be transmitted to the deaf through the device 10 or through the device 11 and a person who is deaf, dumb or blind may of course operate the switches to transmit messages either by the signal lights 47 through 52 or by the touch pins.

Having thus set forth the nature of my invention, what I claim is:

1. In a communicating device, a support, three pairs of pins normally biased to an inoperative position in the support and operating through openings in the support, said pins being arranged in two parallel rows and so spaced that a pin may engage each joint of each of two fingers placed over the rows, an electromagnetic means for each of said pins for shifting the pins toward the said fingers, and control means for said electromagnetic means including an individual manually operable control switch for each electromagnetic means.

2. In a communicating device, a support, a plurality of indicating devices in said support each in position to be touched by a finger of the person being communicated with and arranged in rows spaced laterally to correspond with the spacing of two fingers, and the devices in each row being so spaced that each device is in position to engage a different joint of the finger over that row from each of the other devices of that row, an independent electrical means for operating each of said devices to cause it to impart a sensation to its associated finger joint, control means for said electrical means, said control means including an individual manually operated control switch for each of said means, to cause the corresponding electrical means to operate its device to impart a sensation to the associated finger joint upon operation of the control switches, and said control switches arranged in the same relative positions to each other as are the corresponding indicating means.

3. In a communicating device, a support on which two fingers of a human hand may rest, a plurality of indicating devices on said support arranged in rows spaced laterally corresponding with the spacing of the two fingers, the devices in each row being so spaced that each device is in position to engage a different joint of the finger over that row from each of the other devices of that row, and means for selectively operating each device to impart a sensation to the respective joints.

4. In a communicating device, a support on which two fingers of a human hand may rest, a plurality of indicating devices in said support comprising movable plungers arranged in rows spaced laterally corresponding with the spacing of the two fingers and operating through openings in one wall of the support, the plungers in each row being so spaced that each is in position to engage a different joint of the finger over that row from each of the other plungers of that row, operative means for each plunger mounted in the support to shift it toward the finger, and means for selectively operating the operative means to shift the plungers.

5. In a communicating device, a readily portable support of a size and shape to be easily held in one hand with two fingers of the hand over the surface of one wall thereof, a plurality of indicating devices arranged in two rows spaced laterally to correspond with the spacing of the two fingers and operating through openings in said wall of the support, the devices in each row being so spaced that each device is in position to engage a different joint of the finger over that row from each of the other devices of that row, electromagnetic means mounted in the support for moving each indicator with respect to the fingers, a separate easily portable support, and means mounted on the second support and connected to the respective electromagnetic means for selectively closing a circuit to each electromagnetic means to operate the devices to impart a sensation to the respective joints.

WILLIAM H. CONKLIN.